US012784929B2

(12) United States Patent
Liu et al.

(10) Patent No.: US 12,784,929 B2
(45) Date of Patent: Nov. 3, 2026

(54) RAY COLLIMATION DEVICE AND RADIATION INSPECTION DEVICE

(71) Applicant: Nuctech Company Limited, Beijing (CN)

(72) Inventors: Yaohong Liu, Beijing (CN); Wei Yin, Beijing (CN); Yumei Chen, Beijing (CN); Weiqiang Guan, Beijing (CN); Weike Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 228 days.

(21) Appl. No.: 18/690,081

(22) PCT Filed: Jul. 22, 2022

(86) PCT No.: PCT/CN2022/107410

§ 371 (c)(1),
(2) Date: Mar. 7, 2024

(87) PCT Pub. No.: WO2023/035789

PCT Pub. Date: Mar. 16, 2023

(65) Prior Publication Data

US 2024/0379258 A1 Nov. 14, 2024

(30) Foreign Application Priority Data

Sep. 9, 2021 (CN) ........................ 202111055804.8

(51) Int. Cl.
*G21K 1/04* (2006.01)
*G01N 23/06* (2018.01)

(52) U.S. Cl.
CPC ............... *G21K 1/04* (2013.01); *G01N 23/06* (2013.01); *G01N 2223/316* (2013.01)

(58) Field of Classification Search
CPC ............ G21K 1/04; G21K 1/02; G01N 23/06; G01N 2223/316; G01N 2223/40; G01N 23/04
See application file for complete search history.

(56) References Cited

U.S. PATENT DOCUMENTS 4,953,189 A * 8/1990 Wang ........................ H05G 1/60 378/146
4,969,174 A * 11/1990 Scheid ................... A61B 6/502 378/146

(Continued)

FOREIGN PATENT DOCUMENTS

CN 101339819 A 1/2009
CN 105403580 A 3/2016

(Continued)

OTHER PUBLICATIONS

"Chinese Application No. 202111055804.8, Office Action dated Nov. 11, 2025", w English Translation, Nov. 11, 2025, 14 pgs.

(Continued)

*Primary Examiner* — David A Vanore
(74) *Attorney, Agent, or Firm* — Schwegman Lundberg & Woessner, P.A.

(57) ABSTRACT

Provided are a ray collimation device and a radiation inspection device. The ray collimation device includes a collimation assembly, a transmission assembly, and a driving assembly. The collimation assembly includes a first collimation block and a second collimation block. A collimation opening for collimating rays is provided between the first collimation block and the second collimation block. The transmission assembly includes a first transmission component and a second transmission component connected in a transmission manner, the second transmission component is connected to the driving assembly, and the first transmission component is connected to the first collimation block and the second collimation block. Under a drive of the driving (Continued)

assembly, the first transmission component is movable to drive the first collimation block and the second collimation block to move toward or away from each other at a same speed, thereby adjusting a width of the collimation opening.

15 Claims, 4 Drawing Sheets

(56) References Cited

U.S. PATENT DOCUMENTS

| | | | | |
|---|---|---|---|---|
| 7,399,976 | B2 * | 7/2008 | Kang | G01N 23/04<br>250/390.04 |
| 7,545,906 | B2 * | 6/2009 | Xie | A61B 6/022<br>378/21 |
| 2014/0270069 | A1 | 9/2014 | Ganguly | |
| 2017/0234811 | A1 * | 8/2017 | Zhang | A61B 6/4291<br>378/5 |
| 2020/0105432 | A1 | 4/2020 | Sharpless | |
| 2020/0227183 | A1 | 7/2020 | Sharpless | |
| 2021/0290186 | A1 | 9/2021 | Sharpless | |

FOREIGN PATENT DOCUMENTS

| | | | | | |
|---|---|---|---|---|---|
| CN | 107807137 | A | | 3/2018 | |
| CN | 108020569 | A | * | 5/2018 | A61B 6/06 |
| CN | 207351928 | U | | 5/2018 | |
| CN | 207946377 | U | | 10/2018 | |
| CN | 109471152 | A | | 3/2019 | |
| CN | 110648780 | A | | 1/2020 | |
| CN | 105581806 | B | | 7/2021 | |
| CN | 114664473 | A | | 6/2022 | |
| CN | 115798775 | A | * | 3/2023 | G01N 23/06 |
| CN | 108020569 | B | | 11/2023 | |
| CN | 108594450 | B | | 12/2023 | |
| GB | 1246478 | A | | 9/1971 | |
| GB | 2625957 | A | * | 7/2024 | G01N 23/06 |
| KR | 20160142515 | A | | 12/2016 | |
| WO | WO-2023035789 | A1 | * | 3/2023 | G01N 23/06 |

OTHER PUBLICATIONS

"International Application No. PCT/CN2022/107410, International Search Report and Written Opinion mailed Oct. 25, 2022", (Oct. 25, 2022), 16 pgs.

"German Application No. 11 2022 003 924.8, Office Action dated Jun. 23, 2026", w English Translation, Jun. 23, 2026, 9 pgs.

* cited by examiner

RAY COLLIMATION DEVICE AND RADIATION INSPECTION DEVICE

PRIORITY CLAIM TO RELATED APPLICATIONS

This application is a U.S. national stage filing under 35 U.S.C. § 371 from International Application No. PCT/CN2022/107410, filed on 22 Jul. 2022, and published as WO2023/035789 on 16 Mar. 2023, which claims the benefit under 35 U.S.C. 119 to Chinese Application No. 202111055804.8, filed on 9 Sep. 2021, the benefit of priority of each of which is claimed herein, and which applications and publication are hereby incorporated herein by reference in their entirety.

TECHNICAL FIELD

The present disclosure relates to the field of radiation inspection technology, and in particular, to a ray collimation device and a radiation inspection device.

BACKGROUND

Non-destructive testing refers to a method of inspecting and testing internal and surface structures, states, and types, quantities, shapes, properties, positions, sizes, distributions and variations of defects of test pieces by means of physical or chemical methods with the help of modern technology and equipment by using changes in thermal, acoustic, optical, electrical, magnetic and other reactions caused by internal structure abnormalities or defects of a material, on the premise that an internal testing of mechanical material does not damage or affect a performance of a tested object and does not harm an internal structure of the tested object. Radiographic inspection is a non-destructive testing method. During a radiographic inspection and imaging process, it is necessary to collimate rays so that the rays may penetrate the material for inspection as required.

Due to structural reasons, the ray collimation devices in the related art do not have high accuracy in ray collimation.

SUMMARY

In view of this, the present disclosure provides a ray collimation device and a radiation inspection device to solve at least one aspect of the above problems.

According to an aspect of the present disclosure, a ray collimation device is provided, including a collimation assembly, a transmission assembly, and a driving assembly, the collimation assembly includes a first collimation block and a second collimation block, and a collimation opening configured to collimate rays is provided between the first collimation block and the second collimation block; the transmission assembly includes a first transmission component and a second transmission component that are connected in a transmission manner, the second transmission component is connected to the driving assembly, and the first transmission component is connected to the first collimation block and the second collimation block; and under a drive of the driving assembly, the first transmission component is movable to drive the first collimation block and the second collimation block to move toward each other or away from each other at a same speed, so as to adjust a width of the collimation opening.

Further, the first transmission component includes a transmission shaft, a first movable member and a second movable member, the transmission shaft includes a first shaft segment and a second shaft segment, the first movable member is sleeved on the first shaft segment, the second movable member is sleeved on the second shaft segment, the first collimation block is connected to the first movable member, and the second collimation block is connected to the second movable member; and when the transmission shaft moves, the first movable member and the second movable member are configured to move toward each other or away from each other at a same speed, so as to drive the first collimation block and the second collimation block to move toward each other or away from each other at the same speed.

Further, the transmission shaft includes a lead screw, the first movable member and the second movable member include nuts respectively, and the first movable member and the second movable member are threaded to the first shaft segment and the second shaft segment respectively.

Further, the first shaft segment is provided with a first thread, the second shaft segment is provided with a second thread, and the first thread and the second thread have opposite spiral directions and equal spiral pitches.

Further, the ray collimation device further includes a guide assembly, the guide assembly includes a guide rod arranged in parallel to the transmission shaft, and the guide rod is configured to guide the collimation assembly.

Further, the ray collimation device further includes a frame provided with an accommodation cavity to accommodate the collimation assembly.

Further, the frame includes a first side wall and a second side wall that are oppositely arranged, the frame includes a first connecting hole provided on the first side wall and a second connecting hole provided on the second side wall, and the transmission shaft is rotatably arranged in the first connecting hole and the second connecting hole.

Further, the frame further includes a third connecting hole provided on the first side wall and a fourth connecting hole provided on the second side wall, and the guide rod is connected to the third connecting hole and the fourth connecting hole.

Further, the ray collimation device includes two first transmission components, one of the first transmission components is arranged at an upper end of the frame, the other of the first transmission components is arranged at a lower end of the frame, and the transmission shafts of the two first transmission components are arranged in parallel; and/or the ray collimation device includes two guide assemblies, one of the guide assemblies is arranged at the upper end of the frame, the other of the guide assemblies is arranged at the lower end of the frame, and the guide rods of the two guide assemblies are arranged in parallel.

Further, the second transmission component includes a transmission chain and a transmission wheel, the transmission wheel is connected to the transmission shaft, and the transmission chain is configured to transmit a driving force of the driving assembly to the transmission wheel.

Further, the first shaft segment and the second shaft segment are integrally formed or connected by a connector.

Further, the driving assembly includes a driving motor, one end of the transmission chain is connected to an output shaft of the driving motor, and the other end of the transmission chain is connected to the transmission wheel.

Further, the guide assembly further includes a linear bearing, and the linear bearing is sleeved on the guide rod to guide the collimation assembly.

Further, the ray collimation device further includes a position monitoring component connected to the frame, and the position monitoring component is configured to monitor a position of the first collimation block and/or a position of the second collimation block.

Further, the ray collimation device further includes a control component, the control component is electrically connected to the position monitoring component and the driving assembly, so as to receive a position feedback signal output by the position monitoring component and control the driving assembly.

According to another aspect of the present disclosure, a radiation inspection device is provided, including a ray source configured to emit rays and the ray collimation device described above.

In the embodiments of the present disclosure, as the first collimation block and the second collimation block are movable toward each other or away from each other at the same speed, the widths of the collimation opening before and after the adjustment are based on the same center line, and the center of the collimation may not deviate before and after the width adjustment, so that the stability and the collimation accuracy may be better.

DETAILED DESCRIPTION OF EMBODIMENTS

In order to make objectives, technical solutions and advantages of the present disclosure clearer, a further detailed description of the present disclosure will be provided below in conjunction with specific embodiments and with reference to the accompanying drawings. The following descriptions of the embodiments of the present disclosure with reference to the accompanying drawings are intended to explain a general inventive concept of the present disclosure, and should not be understood as a limitation to the present disclosure.

Figure 1:
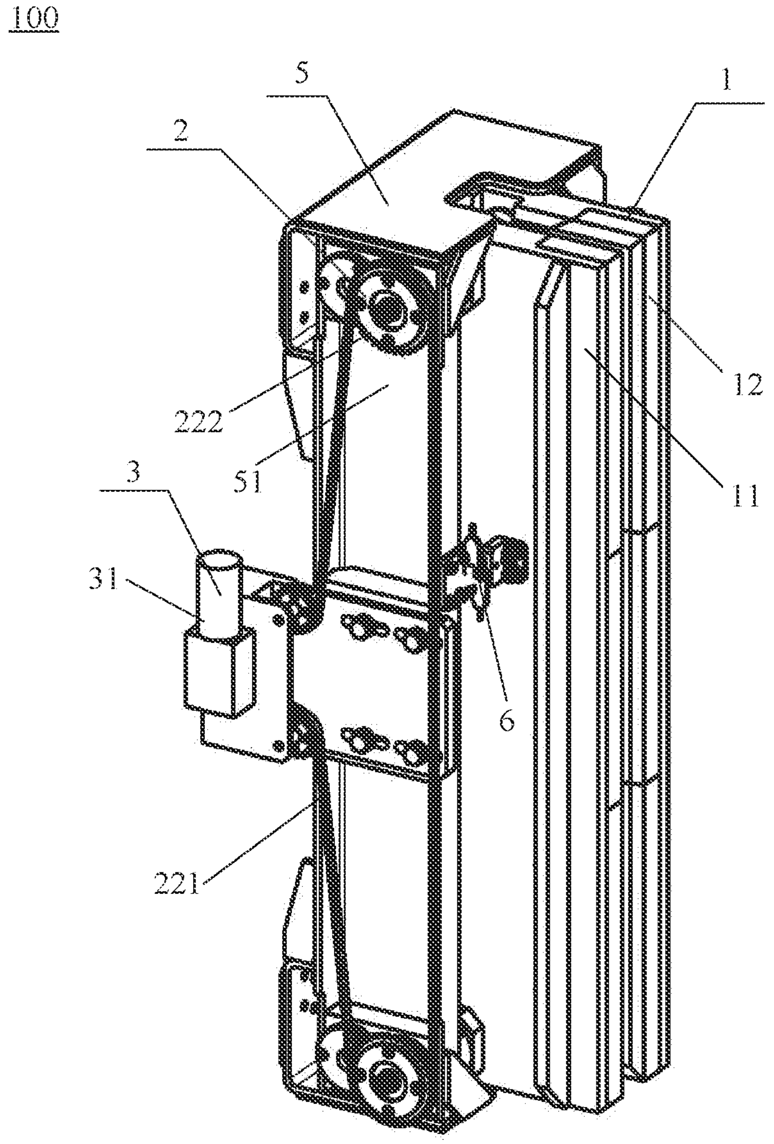
FIG. 1 shows a schematic diagram of an assembly structure of a ray collimation device according to embodiments of the present disclosure.
Figure 2:
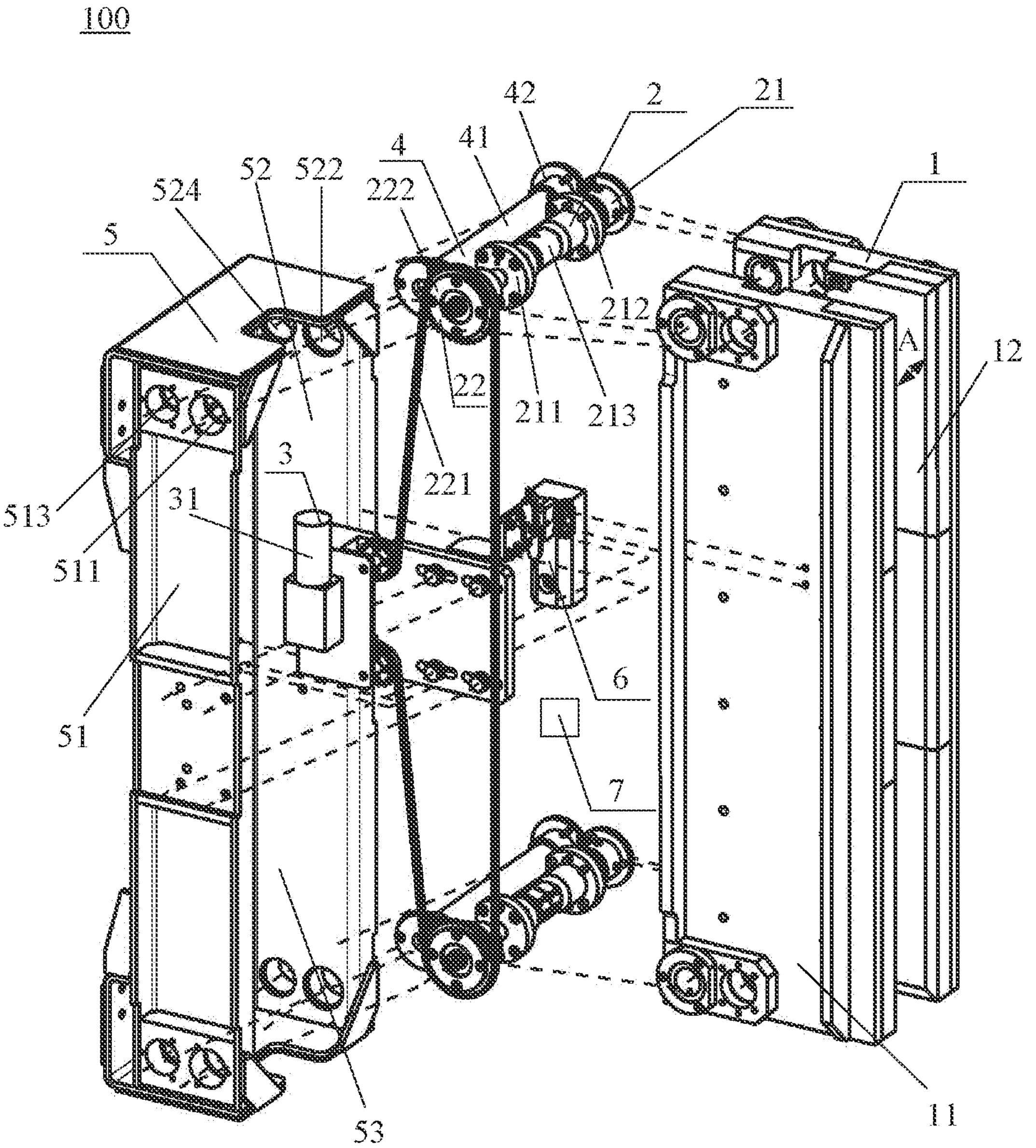
FIG. 2 shows a schematic diagram of an exploded structure of the ray collimation device shown in FIG. 1.

FIG. 1 shows a schematic diagram of an assembly structure of a ray collimation device according to embodiments of the present disclosure. FIG. 2 shows a schematic diagram of an exploded structure of the ray collimation device according to embodiments of the present disclosure. As shown in FIG. 1 and FIG. 2, according to an aspect of the embodiments of the present disclosure, a ray collimation device 100 is provided, including a collimation assembly 1, a transmission assembly 2, and a driving assembly 3. As shown in FIG. 2, the collimation assembly 1 includes a first collimation block 11 and a second collimation block 12. A collimation opening for collimating rays is provided between the first collimation block 11 and the second collimation block 12. The transmission assembly 2 includes a first transmission component 21 and a second transmission component 22 that are connected in a transmission manner. The second transmission component 22 is connected to the driving assembly 3. The first transmission component 21 is connected to the first collimation block 11 and the second collimation block 12. Under a drive of the driving assembly 3, the first transmission component 21 may move to drive the first collimation block 11 and the second collimation block 12 to move toward each other or away from each other at a same speed, thereby adjusting a width of the collimation opening A.

When the ray collimation device 100 according to the embodiments of the present disclosure is used, the driving assembly 3 is started. The driving assembly 3 provides a driving force for the second transmission component 22 connected thereto so as to drive the second transmission component 22 to move. As the first transmission component 21 and the second transmission component 22 are connected in a transmission manner, when the second transmission component 22 moves, the first transmission component 21 moves accordingly so as to drive the first collimation block 11 and the second collimation block 12 connected to the first transmission component 21 to move toward each other or away from each other at the same speed, thereby adjusting the width of the collimation opening A. It should be understood that the "width of the collimation opening A" mentioned here refers to a size of a gap formed between the first collimation block 11 and the second collimation block 12. Rays may pass through the collimation opening A to form collimated light rays having a same size as the width of the collimation opening A.

In the ray collimation device 100 according to the embodiments of the present disclosure, as the first collimation block 11 and the second collimation block 12 may move toward each other or away from each other at the same speed, the width of the collimation opening A before adjustment and the width of the collimation opening A after adjustment are based on a same center line (the "center line" mentioned here may be understood as a line along half of the width of the collimation opening A). Therefore, the center of the collimation opening may not deviate before and after the width adjustment, so that a stability and a collimation accuracy may be better. It should be understood that rays emitted by a ray source may diverge in various directions and intensities gradually weaken with an increase of distance. Therefore, a collimation effect is optimal only when the ray source is aligned with the center line of the width of the collimation opening A.

Figure 3:
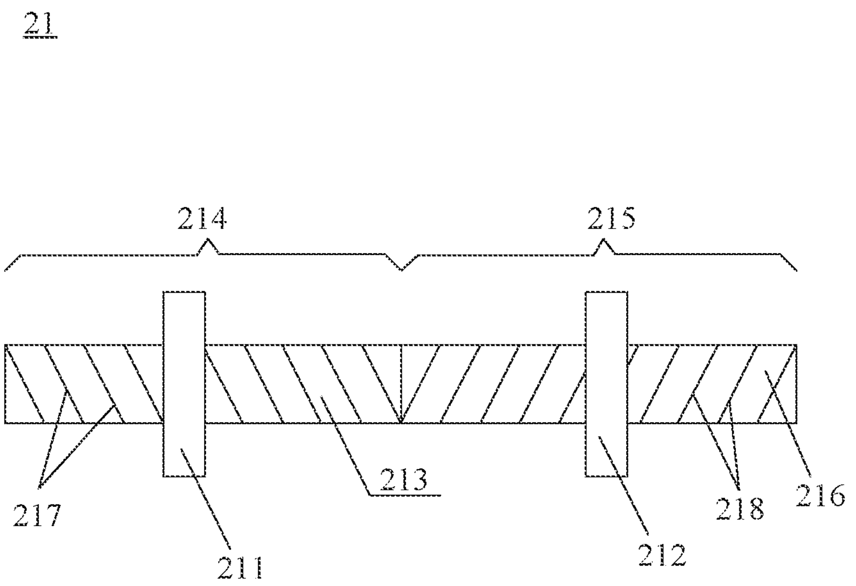
FIG. 3 shows a schematic structural diagram of a first embodiment of a first transmission component shown in FIG. 2.

As shown in FIG. 2 and FIG. 3, according to the embodiments of the present disclosure, the first transmission component 21 may include a transmission shaft 213, a first movable member 211, and a second movable member 212. The transmission shaft 213 may include a first shaft segment 214 and a second shaft segment 215. The first movable member 211 is sleeved on the first shaft segment 214, and the second movable member 212 is sleeved on the second shaft segment 215. The first collimation block 11 is connected to the first movable member 211, and the second collimation block 12 is connected to the second movable member 212. When the transmission shaft 213 moves, the first movable member 211 and the second movable member 212 may move toward each other or away from each other at a same speed so as to drive the first collimation block 11 and the second collimation block 12 to move toward each other or away from each other at the same speed.

By providing the transmission shaft 213 that includes the first shaft segment 214 and the second shaft segment 215, one transmission shaft 213 may be connected to both the first movable member 211 and the second movable member 212 simultaneously, and the transmission shaft 213 may transmit force to the first movable member 211 and the second movable member 212 simultaneously, thereby improving an adjustment accuracy of the first collimation block 11 and the second collimation block 12 to achieve a better collimation effect.

As shown in FIG. 2 and FIG. 3, according to the embodiments of the present disclosure, the transmission shaft 213 may include a lead screw, the first movable member 211 and the second movable member 212 may include nuts respectively, and the first movable member 211 and the second movable member 212 may be threaded to the first shaft segment 214 and the second shaft segment 215 respectively. With such arrangement, the movement of the transmission shaft 213 may drive the first movable member 211 and the second movable member 212 to move linearly along an axial direction of the transmission shaft 213, and movements of the first movable member 211 and the second movable member 212 may respectively drive the first collimation block 11 and the second collimation block 12 to move, thereby adjusting the width of the collimation opening A. In the embodiments of the present disclosure, the transmission shaft 213 performs transmission in the form of a shaft. The transmission shaft 213 is connected to the first movable member 211 and the second movable member 212 in screw-nut pairs, which has characteristics of better rigidity, higher precision and higher bearing capacity. Accordingly, a first collimation block 11 and a second collimation block 12 with larger size and larger weight may be carried, while ensuring a more accurate width adjustment of the collimation opening A of the collimation assembly 1.

As shown in FIG. 2 and FIG. 3, according to the embodiments of the present disclosure, the first shaft segment 214 may be provided with a first thread 217, and the second shaft segment 215 may be provided with a second thread 218. The first thread 217 and the second thread 218 have opposite spiral directions and equal spiral pitches. With such arrangement, the first movable member 211 and the second movable member 212 that are respectively threaded to the first shaft segment 214 and the second shaft segment 215 may move toward each other or away from each other at the same speed based on the same transmission shaft 213, a position of the center line of the collimation opening A may not deviate, so that the width adjustment has better stability and accuracy.

It should be understood that the first movable member 211 and the second movable member 212 are fixedly connected to the first collimation block 11 and the second collimation block 12 respectively, so that when the first movable member 211 and the second movable member 212 move, the first collimation block 11 moves synchronously with the first movable member 211, and the second collimation block 12 moves synchronously with the second movable member 212.

As shown in FIG. 2, the ray collimation device 100 according to the embodiments of the present disclosure may further include a guide assembly 4. The guide assembly 4 may include a guide rod 41. The guide rod 41 is arranged parallel to the transmission shaft 213 and is used to guide the collimation assembly 1. With such arrangement, the collimation assembly 1 may collimate more accurately. Specifically, when the collimation assembly 1 performs collimation, the transmission shaft 213 of the transmission assembly 2 may guide the collimation assembly 1 to a certain extent based on a shaft-like structure of the transmission shaft. As the transmission shaft 213 further has the function of carrying the first collimation block 11 and the second collimation block 12, the guide rod 41 may share the guiding role of the transmission shaft 213 so as to ensure that a movement direction of the first collimation block 11 and a movement direction of the second collimation block 12 may be more accurate, thereby ensuring the collimation effect.

As shown in FIG. 1 and FIG. 2, the ray collimation device 100 according to the embodiments of the present disclosure may further include a frame 5, and the frame 5 is provided with an accommodation cavity 53 for accommodating the collimation assembly 1. With such arrangement, the ray collimation device 100 may have a more compact structure, a smaller volume and a better integration, and it is more convenient to carry and use the ray collimation device 100.

As shown in FIG. 1 and FIG. 2, according to the embodiments of the present disclosure, the frame 5 may include a first side wall 51 and a second side wall 52 that are oppositely arranged. The frame 5 may include a connecting hole 511 provided on the first side wall 51 and a second connecting hole 522 provided on the second side wall 52, and the transmission shaft 213 is rotatably arranged in the first connecting hole 511 and the second connecting hole 522. With such arrangement, a connection strength between the transmission shaft 213 and the frame 5 may be higher, the transmission shaft 213 may further carry the collimation assembly 1 when rotating, and the structure is more rational.

As shown in FIG. 1 and FIG. 2, according to the embodiments of the present disclosure, the frame 5 may further include a third connecting hole 513 provided on the first side wall 51 and a fourth connecting hole 524 provided on the second side wall 52, and the guide rod 41 is connected to the third connecting hole 513 and the fourth connecting hole 524. With such arrangement, a position of the guide rod 41 may be fixed, and a position where the guide rod 41 is provided and a position where the transmission shaft 213 is provided are parallel to each other, so that the guide rod 41 provides a guiding function for the collimation assembly 1.

As shown in FIG. 1 and FIG. 2, the ray collimation device 100 according to the embodiments of the present disclosure may include two first transmission components 21, one of the first transmission components 21 is arranged at an upper end of the frame 5, the other of the first transmission components 21 is arranged at a lower end of the frame 5, and transmission shafts 213 of the two first transmission components 21 are arranged in parallel, and/or the ray collimation device 100 may include two guide assemblies 4, one of the guide assemblies 4 is arranged at the upper end of the frame 5, the other of the guide assemblies 4 is arranged at the lower end of the frame 5, and guide rods 41 of the two guide assemblies 4 are arranged in parallel. With such arrangement, the ray collimation device 100 may have a more stable structure and a higher rigidity. Specifically, the first transmission components 21 and/or the guide assemblies 4 arranged at the upper and lower ends of the frame 5 may improve a stability of the collimation assembly 1 and an entire device, and may also adapt to a heavier and larger-sized collimation assembly 1, thereby improving a rigidity of the entire device.

It should be noted that in the embodiments of the present disclosure, the first collimation block 11 and the second collimation block 12 are plate-shaped, with a simple structure and easy replacement. Furthermore, based on different usage scenarios, it is possible to replace first collimation block 11 and second collimation block 12 of different specifications and sizes.

As shown in FIG. 2, according to the embodiments of the present disclosure, the second transmission component 22 may include a transmission chain 221 and a transmission wheel 222. The transmission wheel 222 is connected to the transmission shaft 213, and the transmission chain 221 is used to transmit the driving force of the driving assembly 3 to the transmission wheel 222. With such arrangement, the second transmission assembly 22 may transmit the driving force of the driving assembly 3 in a chain-transmission manner, which has advantages of no elastic sliding and slipping phenomena, accurate transmission ratio, high transmission power, etc., so as to ensure an accurate width dimension of the collimation opening A and adapt to collimation assemblies 1 of various sizes and weights. Certainly, the second transmission component 22 is not limited to chain transmission.

Figure 4:
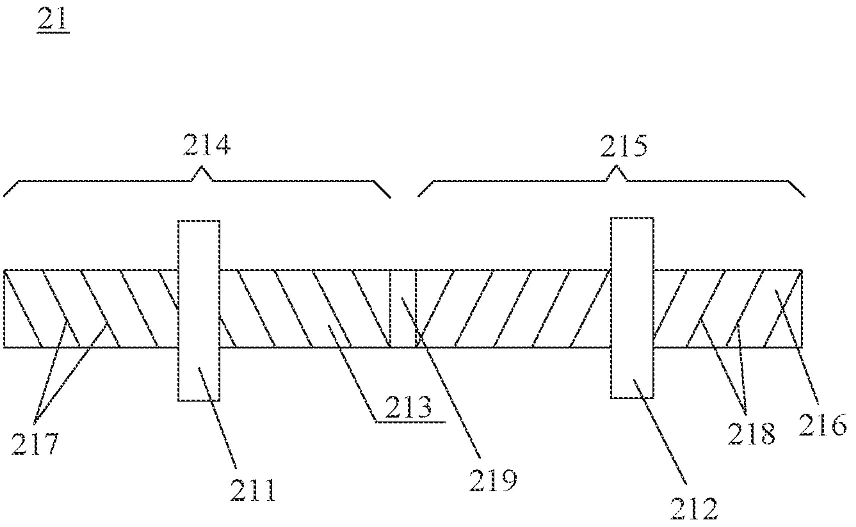
FIG. 4 shows a schematic structural diagram of a second embodiment of the first transmission component shown in FIG. 2.

As shown in FIG. 3 and FIG. 4, according to the embodiments of the present disclosure, the first shaft segment 214 and the second shaft segment 215 may be integrally formed or connected by a connector 219. FIG. 3 shows an embodiment in which the first shaft segment 214 and the second shaft segment 215 are integrally formed; FIG. 4 shows an embodiment in which the first shaft segment 214 and the second shaft segment 215 are connected by the connector 219. In the embodiment shown in FIG. 4, the connector 219 may be configured as a coupling.

As shown in FIG. 1 and FIG. 2, according to the embodiments of the present disclosure, the driving assembly 3 may include a driving motor 31. One end of the transmission chain 221 is connected to an output shaft of the driving motor 31, and the other end of the transmission chain 221 is connected to the transmission wheel 222. The driving motor 31 may provide a stable and sufficient driving force for the transmission assembly 2, so as to ensure corresponding movements of subsequent components.

As shown in FIG. 2, the guide assembly 4 may further include a linear bearing 42 which is sleeved on the guide rod 41 so as to guide the collimation assembly 1. The linear bearing is a linear motion guide structure used in conjunction with a linear guide shaft (i.e., the guide rod 41). Steel balls may roll cyclically along a track groove formed by a housing and a retainer, and the linear bearing performs a linear reciprocating motion with respect to the guide shaft. Through the rolling of the steel balls, an efficient movement with a low friction resistance may be achieved.

As shown in FIG. 1 and FIG. 2, the ray collimation device 100 according to the embodiments of the present disclosure may further include a position monitoring component 6 connected to the frame 5. The position monitoring component 6 is used to monitor a position of the first collimation block 11 and/or a position of the second collimation block 12. With such arrangement, the position of the first collimation block 11 and/or the position of the second collimation block 12 may be monitored in real time by the position monitoring component 6, and the width dimension of the collimation opening A may be obtained, so that the width of the collimation opening A may be monitored in real time, and the adjustment accuracy may be ensured.

Exemplarily, the position monitoring component 6 may be configured as a photoelectric switch.

It should be understood that in the above technical solution, when the position monitoring component 6 monitors the position of the first collimation block 11 and the position of the second collimation block 12, it is needed to provide position monitoring components 6 on two sides of the first collimation block 11 and the second collimation block 12 respectively.

As shown in FIG. 2, the ray collimation device 100 according to the embodiments of the present disclosure may further include a control component 7 which is electrically connected to the position monitoring component 6 and the driving assembly 3, so as to receive a position feedback signal output by the position monitoring component 6 and control the driving assembly 3. With such arrangement, the width of the collimation opening A may be automatically adjusted, and the control component 7 may control the driving assembly 3 through the information fed back by the position monitoring component 6, a degree of intelligence may be improved and human resources may be saved.

It should be noted that, in addition to the frame 5, the first collimation block 11 and the second collimation block 12, other components of the ray collimation device 100 according to the embodiments of the present disclosure, such as the transmission assembly 2, the driving assembly 3, the guide assembly 4, etc., are all standard parts, with good adaptability, easy replacement, and improved economy.

Figure 5:
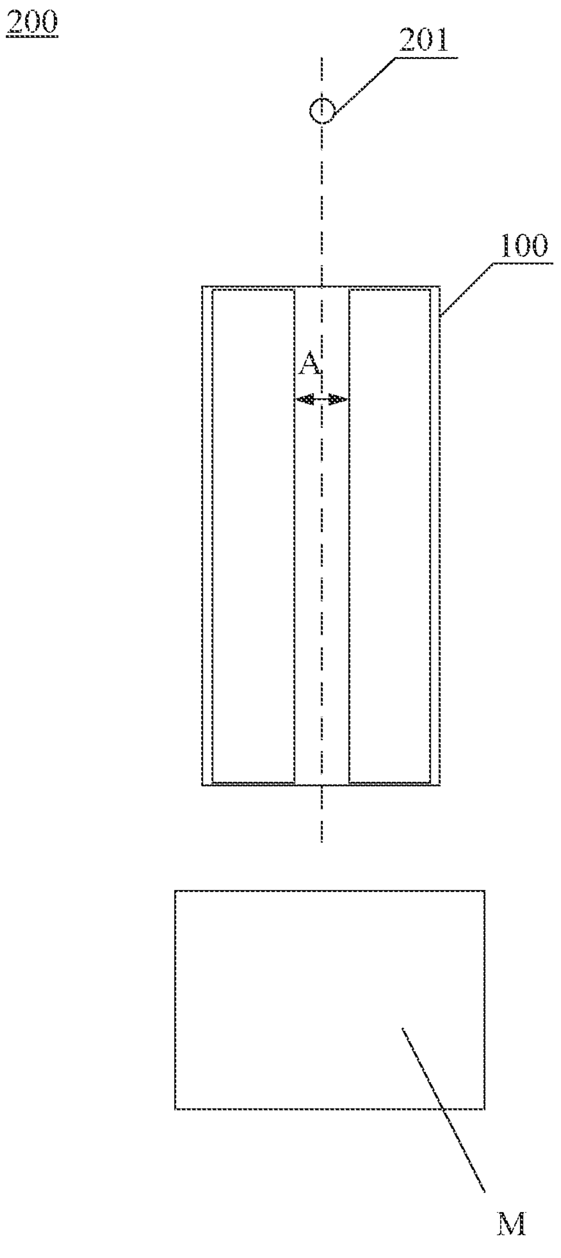
FIG. 5 shows a schematic structural diagram of a radiation inspection device according to embodiments of the present disclosure.

As shown in FIG. 5, according to another aspect of the embodiments of the present disclosure, a radiation inspection device 200 is further provided, including a ray source 201 for emitting rays and the above-mentioned ray collimation device 100.

When the radiation inspection device 200 of the embodiments of the present disclosure is used, the rays emitted from the ray source 201 may diverge in various directions, and the above-mentioned ray collimation device 100 may collimate the rays emitted by the ray source to obtain collimated rays having the same width dimension as the collimation opening A so as to detect an object M to be detected.

As the radiation inspection device 200 of the embodiments of the present disclosure is provided with the above-mentioned ray collimation device 100, the collimation accuracy may be improved.

The above-mentioned specific embodiments further describe the objectives, technical solutions and beneficial effects of the present disclosure in detail. It should be understood that the above are just specific embodiments of the present disclosure and are not intended to limit the present disclosure. Any modifications, equivalent substitutions, improvements, etc. within the spirit and principle of the present disclosure shall be included in the protection scope of the present disclosure.

What is claimed is:

1. A ray collimation device, comprising a collimation assembly, a transmission assembly, and a driving assembly, wherein the collimation assembly comprises a first collimation block and a second collimation block, and a collimation opening configured to collimate rays is provided between the first collimation block and the second collimation block;

wherein the transmission assembly comprises a first transmission component and a second transmission component that are connected in a transmission manner, the second transmission component is connected to the driving assembly, and the first transmission component is connected to the first collimation block and the second collimation block; and wherein under a drive of the driving assembly, the first transmission component is movable to drive the first collimation block and the second collimation block to move toward each other or away from each other at a same speed, so as to adjust a width of the collimation opening;

wherein the first transmission component comprises a transmission shaft, a first movable member and a second movable member, the transmission shaft comprises a first shaft segment and a second shaft segment, the first movable member is sleeved on the first shaft segment, the second movable member is sleeved on the second shaft segment, the first collimation block is connected to the first movable member, and the second collimation block is connected to the second movable member; and wherein when the transmission shaft moves, the first movable member and the second movable member are configured to move toward each other or away from each other at a same speed, so as to drive the first collimation block and the second collimation block to move toward each other or away from each other at the same speed.

2. The ray collimation device according to claim 1, wherein the transmission shaft comprises a lead screw, the first movable member and the second movable member comprise nuts respectively, and the first movable member and the second movable member are threaded to the first shaft segment and the second shaft segment respectively.

3. The ray collimation device according to claim 2, wherein the first shaft segment is provided with a first thread, the second shaft segment is provided with a second thread, and the first thread and the second thread have opposite spiral directions and equal spiral pitches.

4. The ray collimation device according to claim 1, wherein the ray collimation device further comprises a guide assembly, the guide assembly comprises a guide rod arranged in parallel to the transmission shaft, and the guide rod is configured to guide the collimation assembly.

5. The ray collimation device according to claim 4, wherein the ray collimation device further comprises a frame provided with an accommodation cavity to accommodate the collimation assembly.

6. The ray collimation device according to claim 5, wherein the frame comprises a first side wall and a second side wall that are oppositely arranged, the frame comprises a first connecting hole provided on the first side wall and a second connecting hole provided on the second side wall, and the transmission shaft is rotatably arranged in the first connecting hole and the second connecting hole.

7. The ray collimation device according to claim 6, wherein the frame further comprises a third connecting hole provided on the first side wall and a fourth connecting hole provided on the second side wall, and the guide rod is connected to the third connecting hole and the fourth connecting hole.

8. The ray collimation device according to claim 5, wherein the ray collimation device comprises two first transmission components, one of the first transmission components is arranged at an upper end of the frame, the other of the first transmission components is arranged at a lower end of the frame, and the transmission shafts of the two first transmission components are arranged in parallel; and/or the ray collimation device comprises two guide assemblies, one of the guide assemblies is arranged at the upper end of the frame, the other of the guide assemblies is arranged at the lower end of the frame, and the guide rods of the two guide assemblies are arranged in parallel.

9. The ray collimation device according to claim 1, wherein the second transmission component comprises a transmission chain and a transmission wheel, the transmission wheel is connected to the transmission shaft, and the transmission chain is configured to transmit a driving force of the driving assembly to the transmission wheel.

10. The ray collimation device according to claim 1, wherein the first shaft segment and the second shaft segment are integrally formed or connected by a connector.

11. The ray collimation device according to claim 9, wherein the driving assembly comprises a driving motor, one end of the transmission chain is connected to an output shaft of the driving motor, and the other end of the transmission chain is connected to the transmission wheel.

12. The ray collimation device according to claim 4, wherein the guide assembly further comprises a linear bearing, and the linear bearing is sleeved on the guide rod to guide the collimation assembly.

13. The ray collimation device according to claim 5, wherein the ray collimation device further comprises a position monitoring component connected to the frame, and the position monitoring component is configured to monitor a position of the first collimation block and/or a position of the second collimation block.

14. The ray collimation device according to claim 13, wherein the ray collimation device further comprises a control component, the control component is electrically connected to the position monitoring component and the driving assembly, so as to receive a position feedback signal output by the position monitoring component and control the driving assembly.

15. A radiation inspection device, comprising a ray source configured to emit rays and the ray collimation device according to claim 1.

* * * * *